US012567446B2

(12) United States Patent
Yoshioka et al.

(10) Patent No.: US 12,567,446 B2
(45) Date of Patent: Mar. 3, 2026

(54) VIDEO PROCESSING APPARATUS AND CONTROL METHOD

(71) Applicant: CANON KABUSHIKI KAISHA, Tokyo (JP)

(72) Inventors: Takeshi Yoshioka, Kanagawa (JP); Hitoshi Mizutani, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 8 days.

(21) Appl. No.: 18/671,599

(22) Filed: May 22, 2024

(65) Prior Publication Data

US 2024/0395288 A1     Nov. 28, 2024

(30) Foreign Application Priority Data

May 25, 2023     (JP) ................................. 2023-086433

(51) Int. Cl.
G11B 27/34          (2006.01)
(52) U.S. Cl.
CPC .................................... G11B 27/34 (2013.01)
(58) Field of Classification Search
CPC ....................................................... G11B 27/34
See application file for complete search history.

(56) References Cited

U.S. PATENT DOCUMENTS

2011/0189982 A1     8/2011   Shimoda
2015/0170710 A1*    6/2015   Horita .................. G11B 27/322
                                                                      386/241
2021/0051231 A1     2/2021   Cohen

FOREIGN PATENT DOCUMENTS

JP          2002344914 A      11/2002
JP          2005275978 A      10/2005
JP          2011160234 A       8/2011
JP            6548500 B2       7/2019

* cited by examiner

*Primary Examiner* — Girumsew Wendmagegn
(74) *Attorney, Agent, or Firm* — Canon U.S.A., Inc. IP Divsion

(57)          ABSTRACT

A video processing apparatus which generates a video file from a video obtained by an image capturing unit, and includes a file generation unit that divides, into a plurality of time-series partial videos, in accordance with a set division condition, a video captured during a period from when a begin recording instruction is received until a stop recording instruction to stop the recording is received, and generates each partial video file. In a case of generating each partial video file, the file generation unit generates a partial video file having a file name including information representing a temporal ordinal number, and with respect to an end partial video at a temporal end among the plurality of partial videos, the file generation unit generates a partial video file having a file name including information representing a temporal ordinal number and a character string representing an end.

6 Claims, 5 Drawing Sheets

F I G. 1
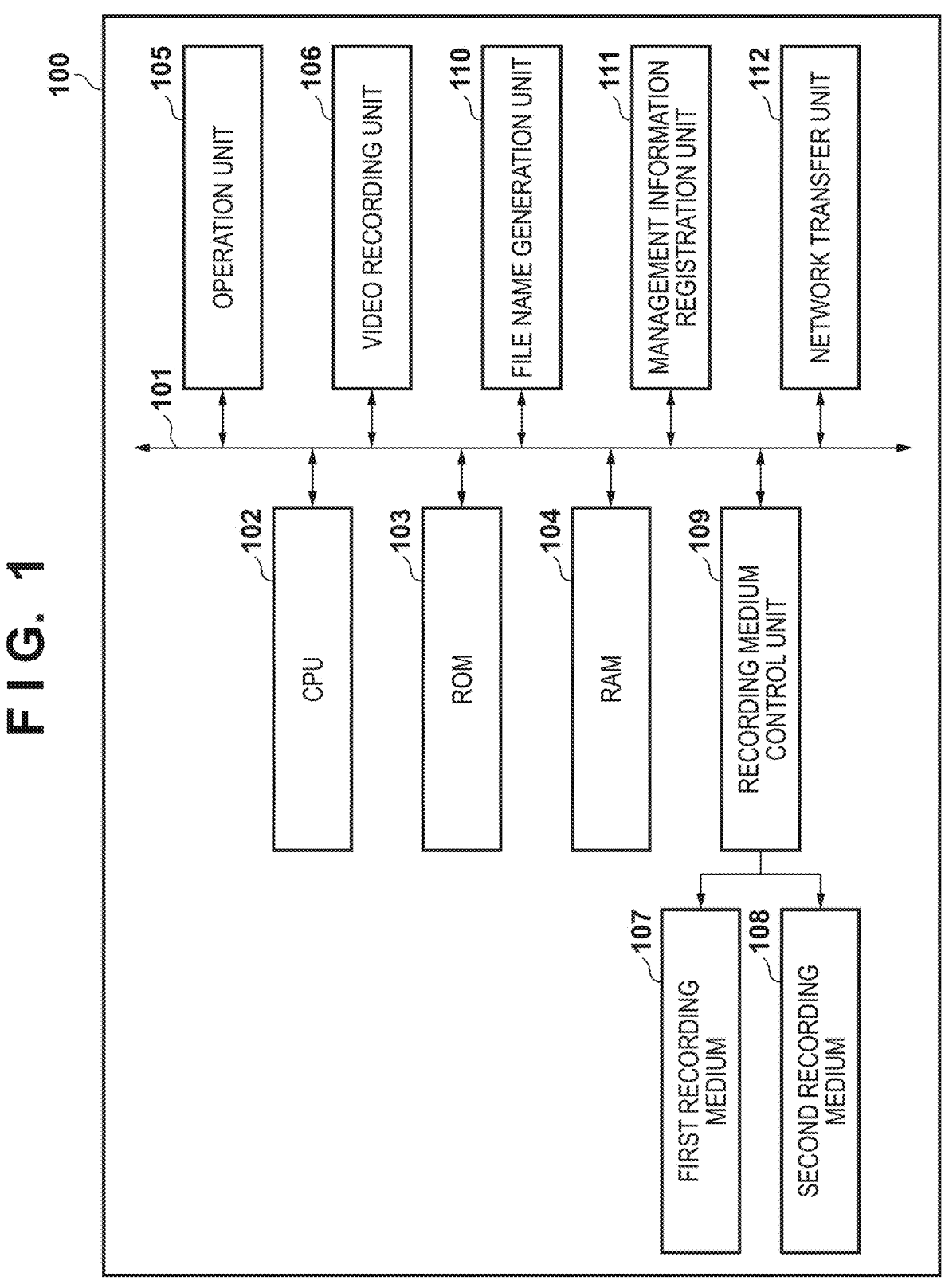

F I G.  2
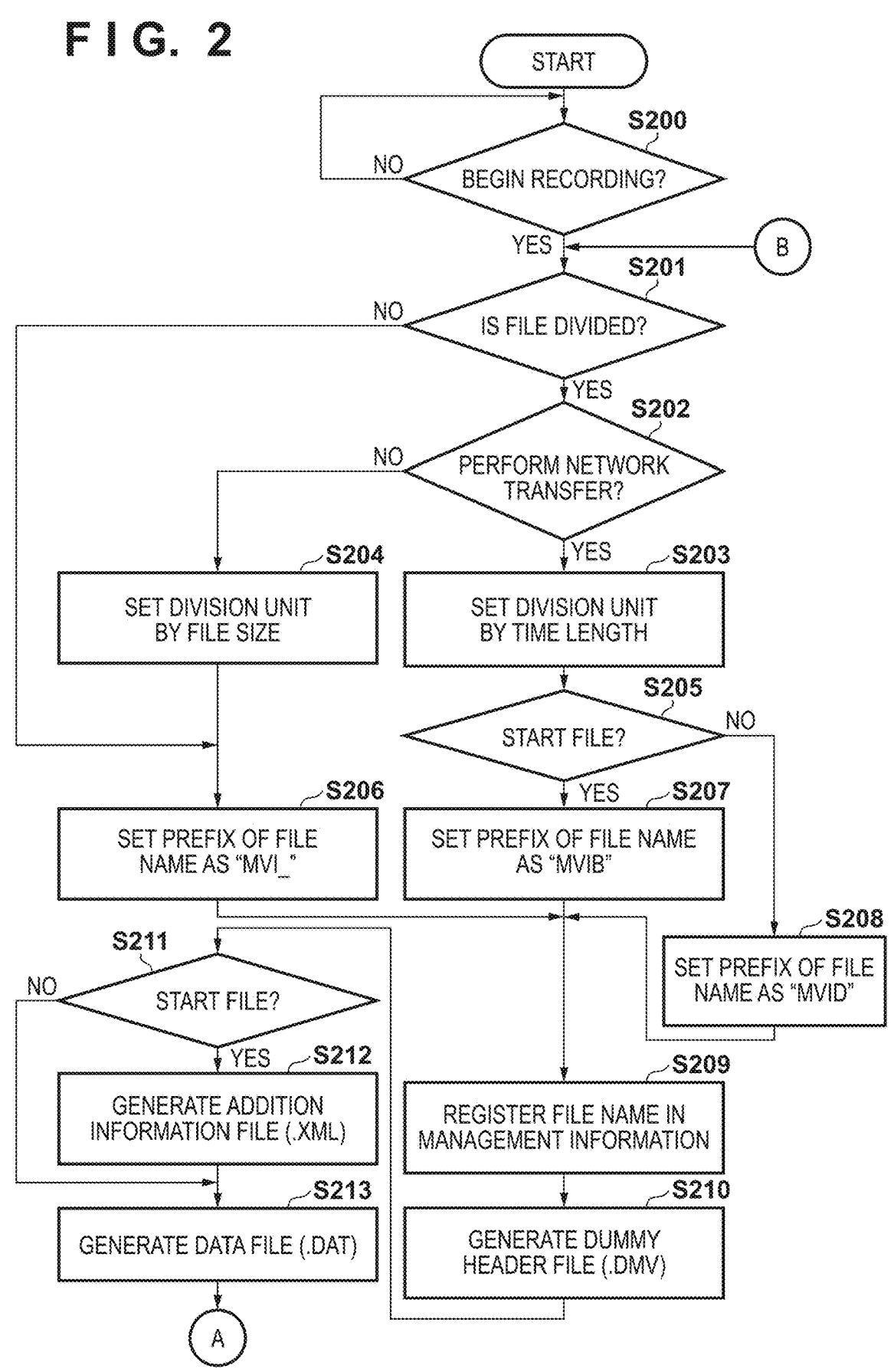

F I G. 4
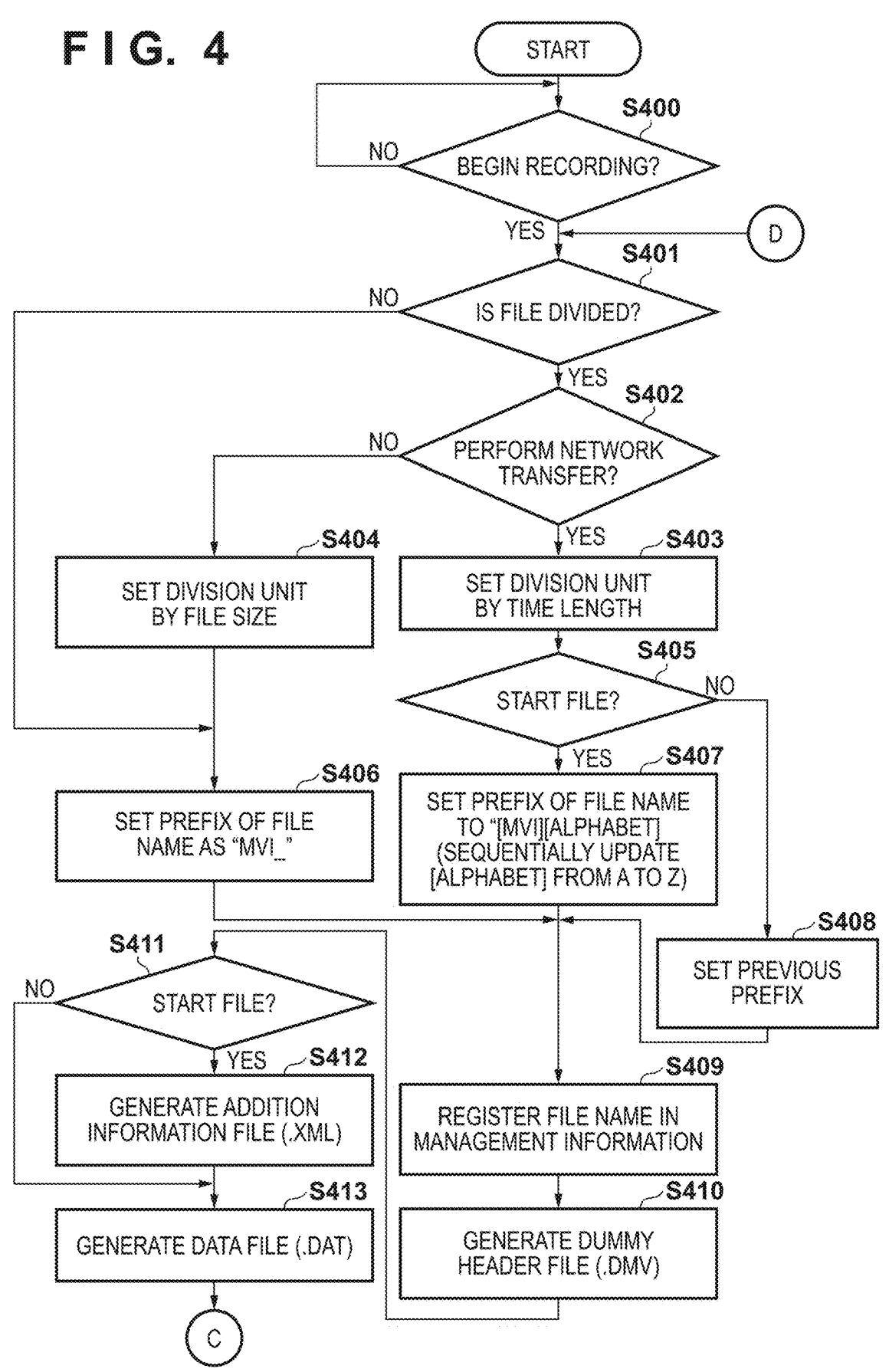

VIDEO PROCESSING APPARATUS AND CONTROL METHOD

BACKGROUND

Field

The present disclosure relates to a video processing apparatus and a control method.

Description of the Related Art

In recent years, in the news industry which includes broadcasters and news agencies, it is necessary to improve efficiency of a production workflow to report correct information quickly more than a Social Networking Service (SNS). Therefore, network transfer of automatically uploading video files to a file server of a broadcaster from a camera has become more important. As a method of implementing network transfer, there is provided a method of recording periodically divided video files in a recording medium attached to a camera and sequentially transferring the completed video files to a file server of a broadcaster. A desired video file is found from an enormous amount of video files accumulated in the file server, and the extracted video file is edited using Non Linear Editing (NLE) software. The fragmented video files having undergone network transfer may be combined to be easily handled at the time of editing, as needed.

However, in this method, since a video file is periodically divided, a unit of division unit is small. When recording is performed for a long time, the number of files may be enormous. As a result, a desired video file cannot be found within a short time. In addition, when combining video files to be readily handled at the time of editing, it is necessary to designate a combining target range but it may be impossible to specify the start file and end file of network transfer by file names.

To solve these problems, efficiency of a file search is improved by devising a file naming convention, thereby extracting a desired video file from an enormous number of files within a short time.

Japanese Patent Laid-Open No. 2002-344914 discloses a method of adding a file name obtained by combining a file name before division and a serial number when dividing a video file. Japanese Patent Laid-Open No. 2005-275978 discloses a method of adding a file name obtained by combining a shooting date and a file number with a video file. Japanese Patent Laid-Open No. 2011-160234 discloses a method of determining a reproduction order when dividing a video file, based on file names added with numbers indicating a file generation order. Japanese Patent No. 6548500 discloses a method of spatially and temporally dividing a video and changing a video file name based on metadata of division information (shooting date and the like).

According to each of Japanese Patent Laid-Open Nos. 2002-344914, 2005-275978, and 2011-160234, since file names are added with numbers indicating a file generation order, it is possible to specify a start file at the beginning of recording. However, when recording is repeated, it is impossible to specify an end file at the stop of the recording.

Japanese Patent No. 6548500 does not mention a method of specifying, from a file name, an end file at the stop of recording. It is possible to specify an end file from metadata held in a video file. However, if the number of files is enormous, it takes a long time to open files and analyze the metadata.

SUMMARY

The present disclosure has been made in consideration of the aforementioned problems, and realizes techniques for readily specifying, using a file name, an end file at the stop of recording among video files that are divided and recorded from the beginning of the recording to the stop of the recording.

In order to solve the aforementioned problems, various embodiments of the present disclosure provide a video processing apparatus which generates a video file from a video obtained by an image capturing unit. The video processing apparatus includes an operation unit that instructs to begin and stop recording; and a file generation unit that divides, into a plurality of time-series partial videos, in accordance with a set division condition, a video captured by the image capturing unit during a period from when an instruction to begin recording by the operation unit is received until an instruction to stop the recording is received, and generates each partial video file, wherein in a case of generating each partial video file, the file generation unit generates a partial video file having a file name including information representing a temporal ordinal number, and with respect to an end partial video at a temporal end among the plurality of partial videos, the file generation unit generates a partial video file having a file name including information representing a temporal ordinal number and a character string representing an end.

In order to solve the aforementioned problems, various embodiments of the present disclosure provide a video processing apparatus includes: an operation unit that instructs to begin and stop recording; a file generation unit that generates a video file from a video obtained by an image capturing unit; and a transfer unit that transfers the video file to an external apparatus, wherein in a case where the transfer unit transfers the video file to the external apparatus, the file generation unit divides, into a plurality of partial videos, in accordance with a first division condition, the video captured by the image capturing unit during the period from when the instruction to begin recording by the operation unit is received until the instruction to stop the recording is received, and generates each partial video file, and in a case where the transfer unit does not transfer the video file to the external apparatus, the file generation unit generates a video file without dividing, in accordance with the first division condition, the video captured by the image capturing unit during the period from when the instruction to begin recording by the operation unit is received until the instruction to stop the recording is received, in a case of generating each partial video file, the file generation unit generates a partial video file having a file name including information representing a temporal ordinal number, and with respect to an end partial video at a temporal end among the plurality of partial videos, the file generation unit generates a partial video file having a file name including information representing a temporal ordinal number and a character string representing an end.

In order to solve the aforementioned problems, various embodiments of the present disclosure provide a method of controlling a video processing apparatus which includes an image capturing unit and an operation unit, and generates, in accordance with an operation of the operation unit, a video file from a video obtained by the image capturing unit, the method comprising: dividing, into a plurality of time-series partial videos, in accordance with a set division condition, a video captured by the image capturing unit during a period from when an instruction to begin recording by the operation unit is received until an instruction to stop the recording is received, and generating each partial video file, wherein in the dividing, in a case of generating each partial video file, a partial video file having a file name including information representing a temporal ordinal number is generated, and with respect to an end partial video at a temporal end among the plurality of partial videos, a partial video file having a file name including information representing a temporal ordinal number and a character string representing an end is generated.

In order to solve the aforementioned problems, various embodiments of the present disclosure provide a method of controlling a video processing apparatus which includes an operation unit that instructs to begin and stop recording, the method comprising: generating a video file from a video obtained by an image capturing unit; and transferring the video file to an external apparatus, wherein in a case where the transfer unit transfers the video file to the external apparatus, the generating unit divides, into a plurality of partial videos, in accordance with a first division condition, the video captured by the image capturing unit during the period from when the instruction to begin recording by the operation unit is received until the instruction to stop the recording is received, and generates each partial video file, and in a case where the transfer unit does not transfer the video file to the external apparatus, the generating generates a video file without dividing, in accordance with the first division condition, the video captured by the image capturing unit during the period from when the instruction to begin recording by the operation unit is received until the instruction to stop the recording is received, in a case of generating each partial video file, the generating generates a partial video file having a file name including information representing a temporal ordinal number, and with respect to an end partial video at a temporal end among the plurality of partial videos, the generating generates a partial video file having a file name including information representing a temporal ordinal number and a character string representing an end.

According to various embodiments of the present disclosure, it is possible to readily specify an end file at the stop of recording among video files that are divided and recorded from the beginning of the recording to the stop of the recording.

Further features of the present disclosure will become apparent from the following description of exemplary embodiments (with reference to the attached drawings).

BRIEF DESCRIPTION OF THE DRAWINGS

FIG. 1 is a block diagram exemplifying the configuration of a video processing apparatus according to an embodiment;

FIG. 2 is a flowchart exemplifying video recording processing according to the first embodiment;

FIG. 4 is a flowchart exemplifying video recording processing according to the second embodiment.

DESCRIPTION OF THE EMBODIMENTS

Figure 3:
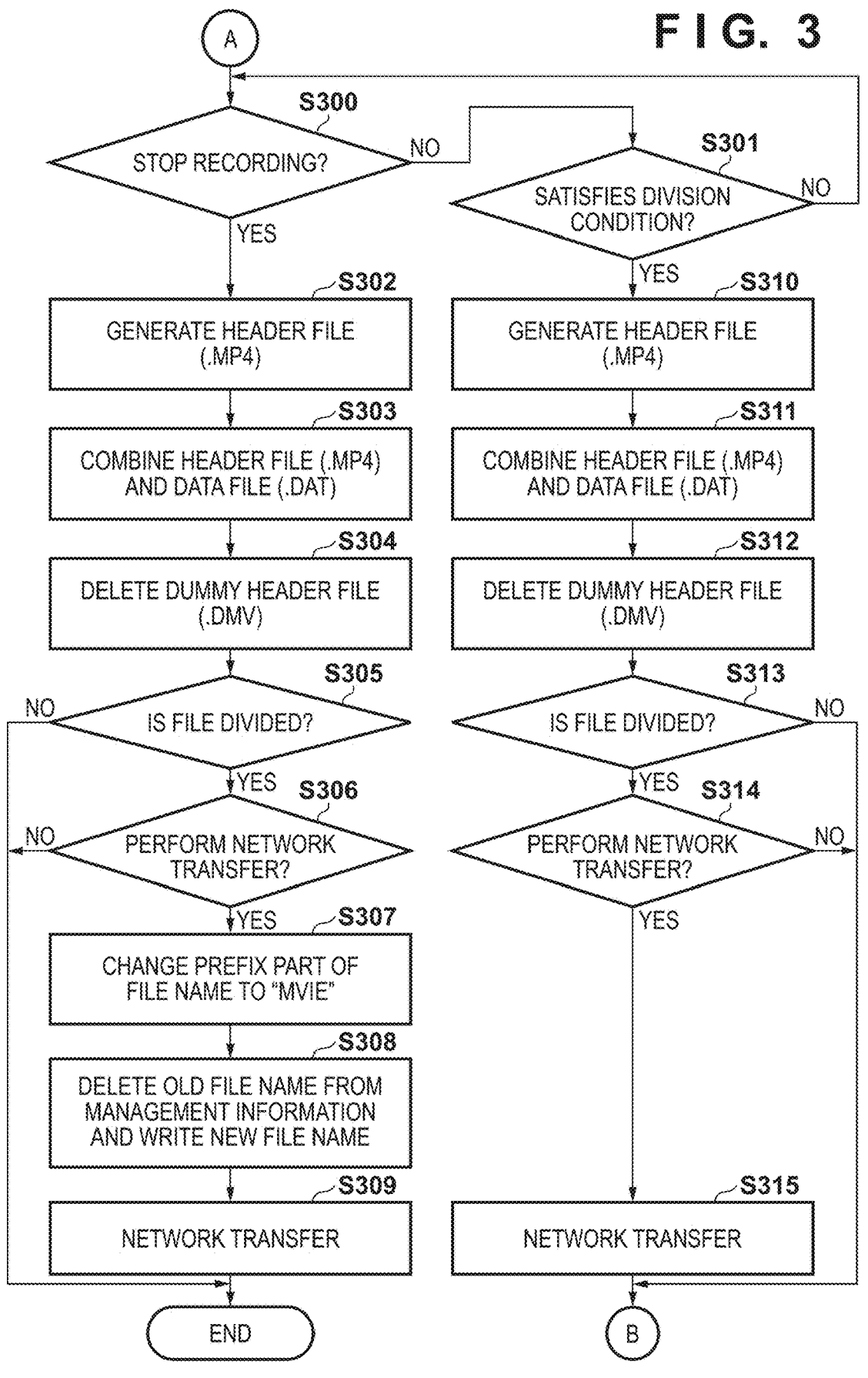
FIG. 3 is a flowchart exemplifying the video recording processing according to the first embodiment.

Hereinafter, some embodiments will be described in detail with reference to the attached drawings. Note, the following embodiments are not intended to limit the scope of the claimed invention. Multiple features are described in the embodiments, but limitation is not made to an embodiment that requires all such features, and multiple such features may be combined as appropriate. Furthermore, in the attached drawings, the same reference numerals are given to the same or similar configurations, and redundant description thereof is omitted.

An overview of an embodiment will be described first. There is a desire to improve efficiency of a production workflow in the news industry or the like. In this embodiment, for the sake of easy understanding, network transfer of automatically uploading, as video files, images shot by a cameraman using a camera to a file server of a broadcaster will be exemplified. Network transfer is intended for video files of a low bit rate for proxy editing but it is also possible to simultaneously record video files of a high bit rate for archive in addition to network transfer. As a method of implementing network transfer, a method of recording periodically divided video files in a recording medium attached to a camera and sequentially transferring the completed video files to a file server of a broadcaster will be described.

Configuration of Video Processing Apparatus

FIG. 1 is a block diagram exemplifying the internal configuration of a video processing apparatus 100 according to the embodiment. As shown in FIG. 1, the video processing apparatus 100 is formed by a bus 101, a CPU 102, a ROM 103, a RAM 104, an operation unit 105, a video recording unit 106, a first recording medium 107, a second recording medium 108, a recording medium control unit 109, a file name generation unit 110, a management information registration unit 111, and a network transfer unit 112.

The bus 101 is formed by an address bus, a data bus, and a control bus. The bus 101 is used to communicate instructions and data between the components of the video processing apparatus 100.

The CPU 102 is a processor for controlling the respective components of the video processing apparatus 100 by reading out programs stored in the ROM 103 and executing the readout programs.

The ROM 103 is a nonvolatile memory that stores programs, various kinds of setting information, and the like. Note that to cope with update of a program and the like, the ROM 103 is formed by a writable nonvolatile memory (EEPROM or the like).

The RAM 104 is a volatile memory used as a work memory.

The operation unit 105 is formed by a release button and a cross key for performing a selection operation such as a menu setting on a UI screen displayed on a TFT liquid crystal display or the like. The operation unit 105 may be implemented not by physical buttons but by a touch panel. Every time the user presses the release button, the operation unit 105 notifies, via the CPU 102, the video recording unit 106 of one of a begin recording request and a stop recording request of video data. Along with this notification, the operation unit 105 obtains menu setting values selected as recording setting parameters by the user, and notifies the video recording unit 106 of the recording setting parameters. The recording setting parameters are formed by menu setting values such as a recording mode such as normal recording or network transfer and a network transfer interval (time). When network transfer is set on the menu, a video is divided by the time set as the network transfer interval, a partial video file is generated from each divided partial video, and the partial video files are transferred.

The video recording unit 106 includes an image capturing unit formed by an optical lens and an image sensor, a control unit that controls the image capturing unit, and a processing unit that converts (encodes) a video (image data) obtained by capturing into data to be recorded in a recording medium (first and second recording media to be described later). Then, when the video recording unit 106 is notified of a begin recording request from the operation unit 105 via the CPU 102, it begins to record video data by capturing. First, the video recording unit 106 generates image capturing data by forming, on the image sensor, an object image incident via the lens and photoelectrically converting the object image. The video recording unit 106 encodes the image capturing data based on a video compression standard such as H.264/MPEG4 AVC, and buffers the generated video data in the RAM 104. The video recording unit 106 multiplexes the video data by including audio data, and sequentially writes it as a video file in the first recording medium 107 and the second recording medium 108 via the recording medium control unit 109. A file may be divided and recorded from the beginning of recording to the stop of the recording in accordance with a preset division condition. As the division condition, a recording time or a file size is used and can freely be set by the user. For example, in a case where a recording time is selected as a unit of division (hereinafter, division unit), and a unit of 30 sec is set as the recording time, when a moving image shooting period matches the set time, the video recording unit 106 calculates a file division position with reference to a management table that manages the frame number and data size of video data for 3 sec. When reaching the file division position, the video recording unit 106 closes a current video file, and then generates a new video file to continue to write the video data. When the video recording unit 106 is notified of a stop recording request from the operation unit 105 via the CPU 102, it stops recording the video data after completion of write of final data.

Each of the first recording medium 107 and the second recording medium 108 is a detachable recording medium such as an SD card, and is attached to the video processing apparatus 100 to record a video file.

The recording medium control unit 109 is a control unit for writing and loading data in and from the first recording medium 107 and the second recording medium 108. Upon receiving a loading instruction sent from the CPU 102, the recording medium control unit 109 sequentially loads a designated area of the first recording medium 107 and the second recording medium 108 for every predetermined size, and deploys and buffers the data in the RAM 104. Upon receiving a write instruction sent from the CPU 102, the recording medium control unit 109 receives write target data deployed in the RAM 104, and sequentially writes the received data in the first recording medium 107 and the second recording medium 108 for every predetermined size. Upon completion of loading or write, the recording medium control unit 109 notifies the CPU 102 of the completion of the requested processing. Furthermore, the recording medium control unit 109 obtains, as a recording setting parameter, file system information from the first recording medium 107 and the second recording medium 108, and notifies the video recording unit 106 of that fact.

When the file name generation unit 110 is notified of a generate file name request from the video recording unit 106, it determines and generates a file name to be added to a video file. For example, the file name generation unit 110 generates a file name "MVI_0001.MP4" complying with the DCF standard where "MVI_" is a prefix including a user-designated character string, and "0001" is a file number indicating a temporal ordinal number. When file division is performed from the beginning of recording to the stop of the recording in accordance with the preset division condition, the file number is incremented by one for each file division. A file name is basically generated at the beginning of recording. However, if a file name is changed at the stop of the recording, a generate file name request may be sent.

When the management information registration unit 111 is notified of completion of the generation of the file name from the file name generation unit 110, it registers the file name in management information for managing file names held in the RAM 104. When the file name is changed at the stop of the recording, the management information registration unit 111 deletes the old file name from the management information, and reregisters a new file name. The management information may be held in the RAM 104 and may also be written as a management file in the first recording medium 107 and the second recording medium 108.

The network transfer unit 112 includes a network interface. When the video recording unit 106 notifies the network transfer unit 112 of completion of file close processing, the network transfer unit 112 transfers the video file recorded in the second recording medium 108 to an external apparatus such as a preset external file server using File Transfer Protocol (FTP) via the Internet. Note that the network interface of the network transfer unit 112 can be either wired or wireless.

First Embodiment

Recording and transfer processing of a video recording unit 106 according to the first embodiment will be described below with reference to FIGS. 2 and 3. FIG. 2 is a flowchart exemplifying processing at the beginning of recording. Note that the video recording unit 106 performs processing of temporarily buffering a video obtained by an image capturing unit in a RAM 104, and determining the file name of a partial video file of the buffered video data (and audio data) in a case where a division condition (to be described later) is satisfied. Therefore, the following description will be provided by focusing on this point, and processing concerning image capturing processing and accumulation processing will not specifically be described.

In step S200, the video recording unit 106 determines, based on signal from the CPU 102, whether the user performs a begin video recording operation. The CPU 102 monitors a user operation on an operation unit 105, and notifies, upon detecting the pressing of a release button by the user, the video recording unit 106 that the begin recording operation is performed. In accordance with whether the notification is received, the video recording unit 106 determines whether a begin video recording operation is performed. When the video recording unit 106 determines that a begin video recording operation is performed, it notifies a file name generation unit 110 of a begin recording request, and advances the process to step S201. When the video recording unit 106 determines that the begin video recording operation is not performed, it returns the process to step S200, and waits for reception of a begin recording request.

In step S201, the video recording unit 106 determines whether a video file from the beginning of recording to the stop of the recording is divided in accordance with a division condition preset based on recording setting parameters obtained from the operation unit 105 and a recording medium control unit 109. When the video recording unit 106 determines based on the recording setting parameters that a recording mode is network transfer or file system information is FAT32, the video recording unit 106 determines that the file division is performed. When the video recording unit 106 determines that the condition is not satisfied, it determines that the file division is not performed. Note that whether to perform network transfer is preset by the user. Then, when the video recording unit 106 determines that the file division is performed, it notifies the file name generation unit 110 of that fact, and advances the process to step S202. When the video recording unit 106 determines that the file division is not performed, it notifies the file name generation unit 110 of that fact, and advances the process to step S206.

In step S202, the video recording unit 106 determines, based on the recording setting parameters notified from the operation unit 105, whether to perform network transfer of the video file. When the video recording unit 106 determines to perform network transfer, it notifies the file name generation unit 110 of that fact, and advances the process to step S203. When the video recording unit 106 determines not to perform network transfer, it notifies the file name generation unit 110 of that fact, and advances the process to step S204.

In step S203, the video recording unit 106 sets, based on the recording setting parameters notified from the operation unit 105, the division unit of the video file suitable to network transfer by a time length. For example, the user can select the division unit from options of 30 sec, 1 min, and 2 min by changing a menu setting concerning a network transfer interval (time) by the operation unit 105. Upon completion of the setting of the division unit based on the menu setting, the video recording unit 106 advances the process to step S205.

In step S204, the video recording unit 106 sets, based on the recording setting parameters notified from the recording medium control unit 109, the division unit of the video file suitable to a recording medium by a file size. When the file system of the recording medium is FAT32, the video recording unit 106 sets 4 GB (the maximum size that can be managed by FAT32) as the division unit, and when the file system is exFAT, there is substantially no restriction on the file size (the maximum file size is exactly 256 TB), and thus the video recording unit 106 sets no division unit. Upon completion of the setting of the division unit, the video recording unit 106 advances the process to step S206.

In step S205, the video recording unit 106 determines whether the file is a start file at the beginning of recording. The video recording unit 106 performs the determination processing based on whether a file name is generated for the video file for the first time by receiving a begin recording request notified from the operation unit 105. When the video recording unit 106 determines that the file is the start file, the video recording unit 106 advances the process to step S207. When the video recording unit 106 determines that the file is not the start file, the video recording unit 106 advances the process to step S208.

In step S206, the file name generation unit 110 sets "MVI_" as a prefix. "MVI" is a character string used for the file name of a video file, and may be determined in accordance with the recording mode such as a recording format (MP4 or MXF). For the video file that is not divided and the video file that is divided by a file size, a character string obtained by adding "_" to the character string is used as a prefix. The file name generation unit 110 sets, as a character of a file number, a value obtained by incrementing, by one, a file number added to a previously recorded file. The file name generation unit 110 notifies the video recording unit

106 and a management information registration unit 111 of "[prefix][file number]" as a file name without an extension, and advances the process to step S209.

In step S207, the file name generation unit 110 sets, as a prefix, "MVIB" obtained by adding, to "MVI" representing a video file, the initial letter of "Begin" representing the beginning of recording. The file name generation unit 110 sets, as a file number, a value obtained by incrementing, by one, a file number added to a previously recorded file. The file name generation unit 110 notifies the video recording unit 106 and the management information registration unit 111 of completion of the generation of the file name by sending "[prefix][file number]" as a file name without an extension, and advances the process to step S209.

Note that a video processing apparatus 100 sets "1" as a file number at the beginning of recording in a case where a video is recorded first in a day.

In step S208, the file name generation unit 110 sets, as a prefix, "MVID" obtained by adding, to "MVI" representing a video file, the initial letter of "Duration" representing recording (middle of recording). As a file number, a value obtained by adding 1 is set. The file name generation unit 110 notifies the video recording unit 106 and the management information registration unit 111 of "[prefix][file number]" as a file name without an extension, and advances the process to step S209.

In step S209, upon receiving the notification of the completion of the generation of the file name from the file name generation unit 110, the management information registration unit 111 registers the file name in management information, and advances the process to step S210.

In step S210, the video recording unit 106 generates a dummy header storing header information for restoring the video file damaged by an instantaneous power interruption or the like, and writes the generated dummy header in the first recording medium 107 and the second recording medium 108. At this time, the file name of the dummy header is "[prefix][file number].DMV". As the prefix and the file number, the prefix notified from the file name generation unit 110 is used. The video recording unit 106 advances the process to step S211.

In step S211, the video recording unit 106 determines whether the file is the start file at the beginning of recording. When the video recording unit 106 determines that the file is the start file, the video recording unit 106 advances the process to step S212. In step S212, since the corresponding file is the start file at the beginning of recording, the video recording unit 106 records an addition information file including a report title in the extensible Markup Language (XML) format, and advances the process to step S213. At this time, the file name of metadata information is "[prefix][file number].XML". As the prefix and the file number, the prefix notified from the file name generation unit 110 is used.

When the video recording unit 106 determines in step S211 that the corresponding file is not the start file, the video recording unit 106 advances the process to step S213.

In step S213, the video recording unit 106 records a data file in which video data and audio data are multiplexed. At this time, a file name is "[prefix][file number].DAT". As the prefix and the file number, the prefix notified from the file name generation unit 110 is used.

Subsequently, processing after the beginning of recording will be described with reference to FIG. 3. FIG. 3 exemplifies processing following the flowchart of FIG. 2.

In step S300, the video recording unit 106 determines whether the user performs a stop recording operation. The CPU 102 monitors a user operation on the operation unit 105, and notifies, upon detecting the re-pressing of the release button by the user, the video recording unit 106 that a stop recording operation is performed. In accordance with whether the notification is received, the video recording unit 106 determines whether a stop video recording operation is performed. When the video recording unit 106 determines to stop recording, it notifies the file name generation unit 110 of a stop recording request, and advances the process to step S302. When the video recording unit 106 determines that no stop recording operation is performed (recording is continued), it advances the process to step S301.

In step S301, the video recording unit 106 determines whether the video data being recorded satisfies the division condition (the file being recorded reaches the set size or the video data has the set time length). When the video recording unit 106 determines that the division condition is satisfied, it closes the video file being recorded, and advances the process to step S310 to generate a new video file. When the video recording unit 106 determines that the division condition is not satisfied, it returns the process to step S300 to continue recording.

In step S302, the video recording unit 106 generates a header file storing various kinds of information (resolution, frame rate, and the like) concerning the video data, and advances the process to step S303.

In step S303, the video recording unit 106 combines the data file and the header file in the recording medium. The file name of the generated video file is "[prefix][file number].MP4". As the prefix and the file number, the prefix notified from the file name generation unit 110 is used. Upon completion of the combining processing, the video recording unit 106 advances the process to step S304.

In step S304, the video recording unit 106 deletes the dummy header file from the recording medium. Upon completion of the deletion processing, the video recording unit 106 notifies a network transfer unit 112 of completion of file close processing, and advances the process to step S305.

In step S305, the video recording unit 106 determines whether the video file from the beginning of the recording to the stop of the recording is divided in accordance with the division condition preset based on the recording setting parameters notified from the operation unit 105 and the recording medium control unit 109. When the video recording unit 106 determines based on the recording setting parameters that the recording mode is network transfer or file system information is FAT32, the video recording unit 106 determines that the file division is performed. When the video recording unit 106 determines that the condition is not satisfied, it determines that the file division is not performed. When the video recording unit 106 determines that the file division is performed, it notifies the file name generation unit 110 of that fact, and advances the process to step S306. When the video recording unit 106 determines that the file division is not performed, it ends the processing.

In step S306, the video recording unit 106 determines, based on the recording setting parameters notified from the operation unit 105, whether to perform network transfer. When the video recording unit 106 determines to perform network transfer, it notifies the file name generation unit 110 of that fact, and advances the process to step S307. When the video recording unit 106 determines not to perform network transfer, it ends the processing.

In step S307, the file name generation unit 110 changes the prefix of the end file at the stop of the recording from "MVID" to "MVIE" obtained by adding "End" representing the end to "MVI" representing a video file. The file name generation unit 110 notifies the management information registration unit 111 of completion of the generation of the file name, and advances the process to step S308.

In step S308, upon receiving the notification of the completion of the generation of the file name from the file name generation unit 110, the management information registration unit 111 cancels the registration of the video file name before the change in the management information, registers the video file name after the change, and advances the process to step S309.

In step S309, upon receiving the file close completion notification from the video recording unit 106, the network transfer unit 112 transfers the completed video file to a preset external file server, and ends the processing.

Steps S310 to S312 are the same processes as steps S302 to S304 described above.

In step S313, the video recording unit 106 determines whether the video file from the beginning of recording to the stop of the recording is divided in accordance with the division condition preset based on the recording setting parameters notified from the operation unit 105 and the recording medium control unit 109, similar to step S305. When the video recording unit 106 determines that the file division is performed, it advances the process to step S314. When the video recording unit 106 determines that the file division is not performed, it returns the process to step S201.

In step S314, the video recording unit 106 determines, based on the recording setting parameters notified from the operation unit 105, whether to perform network transfer. When the video recording unit 106 determines to perform network transfer, it advances the process to step S315. When the video recording unit 106 determines not to perform network transfer, it returns the process to step S201 of FIG. 2.

In step S315, upon receiving the file close completion notification from the video recording unit 106, the network transfer unit 112 transfers the completed video file to the preset external file server. The video recording unit 106 returns the process to step S201 of FIG. 2.

The first embodiment has described, as video file naming convention, the method of adding a unique prefix in accordance with the recording mode and the like. However, this method may be executed by replacing a prefix by a suffix.

As a result, even when a plurality of videos (scenes) are shot and recorded in a day, the beginning, intermediate, and end files forming each video and the temporal order can uniquely be obtained from the file names.

Note that the size of the partial video file indicating the end of the video depends on a timing of instructing to stop recording by the user, and does not match the set size or the set time length as the division condition.

In the above first embodiment, the respective processing units including the video recording unit 106 perform collaborative processing. However, for example, the CPU 102 may execute programs, thereby implementing processes corresponding to the respective processing units. The same applies to the second embodiment to be described below.

Second Embodiment

Figure 5:
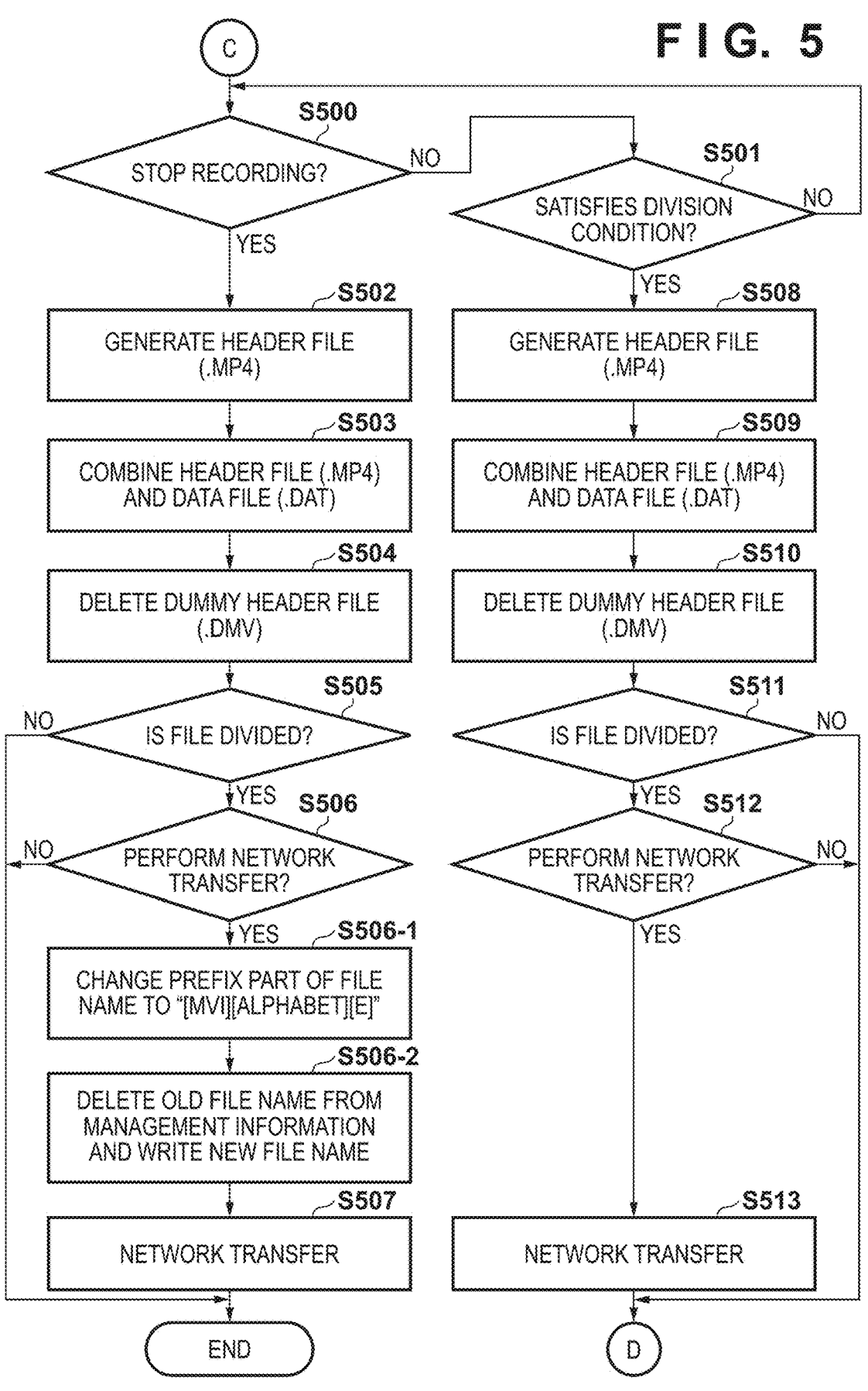
FIG. 5 is a flowchart exemplifying the video recording processing according to the second embodiment.

Recording and transfer processing of video data according to the second embodiment will be described next with reference to FIGS. 4 and 5.

FIG. 4 is a flowchart exemplifying processing at the beginning of recording according to the second embodiment.

In step S400, a video recording unit 106 determines, based on signal from the CPU 102, whether the user performs a begin video recording operation. This determination processing is the same as in step S200 of FIG. 2. When the video recording unit 106 determines that the user issues a video recording beginning instruction, it notifies a file name generation unit 110 of a begin recording request, and advances the process to step S401. When the video recording unit 106 determines that the user does not issue a video recording beginning instruction, it returns the process to step S400, and waits for the instruction.

In step S401, the video recording unit 106 determines whether a video file from the beginning of recording to the stop of the recording is divided in accordance with a division condition preset based on recording setting parameters obtained from an operation unit 105 and a recording medium control unit 109. When the video recording unit 106 determines based on the recording setting parameters that a recording mode is network transfer or file system information is FAT32, the video recording unit 106 determines that the file division is performed. When the video recording unit 106 determines that the condition is not satisfied, it determines that the file division is not performed. When the video recording unit 106 determines that the file division is performed, it notifies the file name generation unit 110 of that fact, and advances the process to step S402. When the video recording unit 106 determines that the file division is not performed, it notifies the file name generation unit 110 of that fact, and advances the process to step S406.

In step S402, the video recording unit 106 determines, based on the recording setting parameters notified from the operation unit 105, whether to perform network transfer of the video file. When the video recording unit 106 determines to perform network transfer, it notifies the file name generation unit 110 of that fact, and advances the process to step S403. When the video recording unit 106 determines not to perform network transfer, it notifies the file name generation unit 110 of that fact, and advances the process to step S404.

In step S403, the video recording unit 106 sets, based on the recording setting parameters notified from the operation unit 105, the division unit of the video file suitable to network transfer by a time length. For example, when the CPU 102 changes a menu setting concerning a network transfer interval, the user can select the division unit from options of 30 sec, 1 min, and 2 min. Upon completion of the setting of the division unit based on the menu setting, the video recording unit 106 advances the process to step S405.

In step S404, the video recording unit 106 sets, based on the recording setting parameters notified from the recording medium control unit 109, the division unit of the video file suitable to a recording medium by a file size. When the file system is FAT32, the video recording unit 106 sets 4 GB as the division unit, and when the file system is exFAT, the video recording unit 106 determines not to set the division unit since the file division is not performed. Upon completion of the setting of the division unit, the video recording unit 106 advances the process to step S406.

In step S405, the video recording unit 106 determines whether the file is a start file at the beginning of recording. The video recording unit 106 performs the determination processing based on whether a file name is generated for the video file for the first time by receiving a begin recording request notified from the operation unit 105. When the video recording unit 106 determines that the file is the start file, the video recording unit 106 advances the process to step S407.

When the video recording unit 106 determines that the file is not the start file, the video recording unit 106 advances the process to step S408.

In step S406, the file name generation unit 110 sets "MVI_" as a prefix. The file name generation unit 110 sets, as a file number, a value obtained by incrementing, by one, the file number of a previously recorded file. The file name generation unit 110 notifies the video recording unit 106 and a management information registration unit 111 of "[prefix][file number]" as a file name without an extension, and advances the process to step S409.

In step S407, the file name generation unit 110 sets "[MVI][alphabet]" as a prefix. The file name generation unit 110 sequentially updates [alphabet] from "A" to "Z" for each recording period from the beginning of recording to the stop of the recording. Note that [alphabet] need not be limited to one character, and a character code other than the alphabet may be used. The file name generation unit 110 sets, as a file number following the prefix, a value obtained by incrementing, by one, the file number of a previously recorded file. Then, the file name generation unit 110 notifies the video recording unit 106 and the management information registration unit 111 of "[prefix][file number]" as a file name without an extension, and advances the process to step S409.

In step S408, the file name generation unit 110 sets, as a prefix, the prefix previously used. That is, the same prefix is added during a recording period from the beginning of recording to the stop of the recording. Furthermore, the file name generation unit 110 sets, as a file number, a value obtained by incrementing, by one, the file number of a previously recorded file. The file name generation unit 110 notifies the video recording unit 106 and the management information registration unit 111 of "[prefix][file number]" as a file name without an extension, and advances the process to step S409.

In step S409, upon receiving the notification of the completion of the generation of the file name from the file name generation unit 110, the management information registration unit 111 registers the file name in management information, and advances the process to step S410.

In step S410, the video recording unit 106 generates a dummy header storing header information for restoring the video file damaged by an instantaneous power interruption or the like, and writes the generated dummy header in a first recording medium 107 and a second recording medium 108. At this time, the file name of the dummy header is "[prefix][file number].DMV". As the prefix and the file number, the prefix notified from the file name generation unit 110 is used. The video recording unit 106 advances the process to step S411.

In step S411, the video recording unit 106 determines whether the file to be recorded is the start file at the beginning of recording. When the video recording unit 106 determines that the file is the start file, the video recording unit 106 records an addition information file including a report title in the extensible Markup Language (XML) format, and advances the process to step S413. At this time, the file name of metadata information is "[prefix][file number]. XML". As the prefix and the file number, the prefix notified from the file name generation unit 110 is used. When the video recording unit 106 determines that the file is not the start file, the video recording unit 106 advances the process to step S413.

In step S413, the video recording unit 106 records a data file in which video data and audio data are multiplexed. At this time, a file name is "[prefix][file number].DAT". As the prefix and the file number, the prefix notified from the file name generation unit 110 is used.

Processing after the beginning of recording will be described with reference to FIG. 5. FIG. 5 exemplifies processing following the flowchart of FIG. 4.

In step S500, the video recording unit 106 determines whether the user issues an instruction to stop the recording of the video data, similar to step S300 of FIG. 3. When the video recording unit 106 determines that the user issues a recording stop instruction, it notifies the file name generation unit 110 of a stop recording request, and advances the process to step S502. When the video recording unit 106 determines that the user does not issue the recording stop instruction, it advances the process to step S501.

In step S501, the video recording unit 106 determines whether the video data being recorded satisfies the division condition. When the video recording unit 106 determines that the division condition is satisfied, it closes the video file being recorded, and advances the process to step S508 to generate a new video file. When the video recording unit 106 determines that the division condition is not satisfied, it returns the process to step S500 to continue recording.

In step S502, the video recording unit 106 generates a header file storing various kinds of information (resolution, frame rate, and the like) concerning the video data, and advances the process to step S503.

In step S503, the video recording unit 106 combines the data file and the header file in the recording medium. The file name of the combined generated video file is "[prefix][file number].MP4". As the prefix and the file number, the prefix notified from the file name generation unit 110 is used. Upon completion of the combining processing, the video recording unit 106 advances the process to step S504.

In step S504, the video recording unit 106 deletes the dummy header file from the recording medium. Upon completion of the deletion processing, the video recording unit 106 notifies a network transfer unit 112 of the completion of file close processing, and advances the process to step S505.

In step S505, the video recording unit 106 determines whether the video file from the beginning of the recording to the stop of the recording is divided in accordance with the division condition preset based on the recording setting parameters notified from the operation unit 105 and the recording medium control unit 109. When the video recording unit 106 determines based on the recording setting parameters that the recording mode is network transfer or file system information is FAT32, the video recording unit 106 determines that the file division is performed. When the video recording unit 106 determines that the condition is not satisfied, it determines that the file division is not performed. When the video recording unit 106 determines that the file division is performed, it notifies the file name generation unit 110 of that fact, and advances the process to step S506. When the video recording unit 106 determines that the file division is not performed, it ends the processing.

In step S506, the video recording unit 106 determines, based on the recording setting parameters notified from the operation unit 105, whether to perform network transfer. When the video recording unit 106 determines to perform network transfer, it notifies the file name generation unit 110 of that fact, and advances the process to step S506-1. When the video recording unit 106 determines not to perform network transfer, it ends the processing.

In step S506-1, the file name generation unit 110 changes the prefix of the end file at the stop of the recording from "[MVI][alphabet]" to "[MVI][alphabet][E]" obtained by adding the initial letter of "End" representing the end to "MVI" representing a video file. The file name generation unit 110 notifies the management information registration unit 111 of the completion of the generation of the file name, and advances the process to step S506-2.

In step S506-2, upon receiving the notification of the completion of the generation of the file name from the file name generation unit 110, the management information registration unit 111 cancels the registration of the video file name before the change in the management information, registers the video file name after the change, and advances the process to step S507.

In step S507, upon receiving the file close completion notification from the video recording unit 106, the network transfer unit 112 transfers the completed video file to an external file server, and the video recording unit 106 ends the processing.

Steps S508 to S510 are the same processes as steps S502 to S504 described above and a description thereof will be omitted.

In step S511, the video recording unit 106 determines whether the video file from the beginning of the recording to the stop of the recording is divided in accordance with the division condition preset based on the recording setting parameters notified from the operation unit 105 and the recording medium control unit 109, similar to step S505. When the video recording unit 106 determines that the file division is performed, it advances the process to step S512. When the video recording unit 106 determines that the file division is not performed, it returns the process to step S401 of FIG. 4.

In step S512, the video recording unit 106 determines, based on the recording setting parameters notified from the operation unit 105, whether to perform network transfer. When the video recording unit 106 determines to perform network transfer, it advances the process to step S513. When the video recording unit 106 determines not to perform network transfer, it returns the process to step S401 of FIG. 4.

In step S513, upon receiving the file close completion notification from the video recording unit 106, the network transfer unit 112 transfers the completed video file to the external file server. The video recording unit 106 returns the process to step S401 of FIG. 4.

As described above, according to the second embodiment, when a plurality of videos are recorded in a day, it is possible to readily specify the beginning and end files of each video without mixing the videos.

Note that the method of adding a unique prefix in accordance with the recording mode and the like has been described as video file naming convention. However, this method may be executed by replacing a prefix by a suffix.

Each of the above first and second embodiments has described the video processing apparatus 100 as an apparatus (represented by a video camera or a smartphone) including an image capturing unit. However, an information processing apparatus externally attached with an image capturing unit or an image capture apparatus may be used.

Other Embodiments

Various embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2023-086433, filed May 25, 2023, which is hereby incorporated by reference herein in its entirety.

What is claimed is:

1. A video processing apparatus comprising:
an operation member that instructs to begin and stop recording;
at least one memory storing instructions; and
at least one processor executing the instructions to:
generate a video file from a video obtained by a camera; and
transfers the video file to an external apparatus, wherein
in a case where the video file is transferred to the external apparatus, the video file is divided into a plurality of partial videos, in accordance with a first division condition, the video captured by the camera during the period from when the instruction to begin recording by the operation member is received until the instruction to stop the recording is received, and generates each partial video file, and
in a case where the video file is not transferred to the external apparatus, a video file is generated without dividing, in accordance with the first division condition, the video captured by the camera during the period from when the instruction to begin recording by the operation member is received until the instruction to stop the recording is received,
in a case of generating each partial video file, a partial video file is generated having a file name including information representing a temporal ordinal number, and
with respect to an end partial video at a temporal end among the plurality of partial videos, a partial video file is generated having a file name including information representing a temporal ordinal number and a character string representing an end.

2. The apparatus according to claim 1, wherein the at least one processor executing the instructions to further set, in accordance with a user operation, (i) whether to transfer the video to the external apparatus and (ii) a time of a partial video to be transferred,
wherein the first division condition is determined based on the time of the partial video set.

3. The apparatus according to claim 1, wherein in a case where the video file is not transferred to the external apparatus, the video file is divided into a plurality of partial videos, in accordance with a second division condition different from the first division condition, the video captured by the camera during the period from when the instruction to begin recording by the operation member is received until the instruction to stop the recording is received, and generates each partial video file.

4. The apparatus according to claim 3, wherein the first division condition is a condition concerning a time of a partial video, and the second division condition is a condition concerning a file size of a partial video file.

5. A method of controlling a video processing apparatus which includes an operation member that instructs to begin and stop recording, the method comprising:
generating a video file from a video obtained by a camera; and
transferring the video file to an external apparatus, wherein
in a case where the video file is transferred to the external apparatus, the video file is divided into a plurality of partial videos, in accordance with a first division condition, the video captured by the camera during the period from when the instruction to begin recording by the operation member is received until the instruction to stop the recording is received, and generates each partial video file, and
in a case where the video file is not transferred to the external apparatus, a video file is generated without dividing, in accordance with the first division condition, the video captured by the camera during the period from when the instruction to begin recording by the operation member is received until the instruction to stop the recording is received,
in a case of generating each partial video file, a partial video file is generated having a file name including information representing a temporal ordinal number, and
with respect to an end partial video at a temporal end among the plurality of partial videos, a partial video file is generated having a file name including information representing a temporal ordinal number and a character string representing an end.

6. A non-transitory computer-readable storage medium storing a program for causing a computer to execute a method of controlling a video processing apparatus which includes an operation member that instructs to begin and stop recording, the method comprising:
generating a video file from a video obtained by a camera; and
transferring the video file to an external apparatus, wherein
in a case where the video file is transferred to the external apparatus, the video file is divided into a plurality of partial videos, in accordance with a first division condition, the video captured by the camera during the period from when the instruction to begin recording by the operation member is received until the instruction to stop the recording is received, and generates each partial video file, and in a case where the video file is not transferred to the external apparatus, a video file is generated without dividing, in accordance with the first division condition, the video captured by the camera during the period from when the instruction to begin recording by the operation member is received until the instruction to stop the recording is received, in a case of generating each partial video file, a partial video file is generated having a file name including information representing a temporal ordinal number, and with respect to an end partial video at a temporal end among the plurality of partial videos, a partial video file is generated having a file name including information representing a temporal ordinal number and a character string representing an end.

\* \* \* \* \*